(No Model.)  2 Sheets—Sheet 1.

W. THOMAS.
PHOTOGRAPHIC CAMERA.

No. 272,173.  Patented Feb. 13, 1883.

WITNESSES:
Jno. K. Rosenbaum
Otto Risch

INVENTOR
William Thomas
BY Paul Goepel
ATTORNEY (No Model.) 2 Sheets—Sheet 2.

W. THOMAS.
PHOTOGRAPHIC CAMERA.

No. 272,173. Patented Feb. 13, 1883.

WITNESSES:
Joh. N. Rosenbaum.
Otto Risch.

INVENTOR
William Thomas
BY Paul Goepel.
ATTORNEY

UNITED STATES PATENT OFFICE.

WILLIAM THOMAS, OF NEW YORK, N. Y.

PHOTOGRAPHIC CAMERA.

SPECIFICATION forming part of Letters Patent No. 272,173, dated February 13, 1883.

Application filed November 10, 1882. (No model.)

*To all whom it may concern:*

Be it known that I, WILLIAM THOMAS, of the city, county, and State of New York, have invented certain new and useful Improvements in Photographic Cameras, of which the following is a specification.

The object of this invention is to furnish for outdoor photography an improved portable camera, so as to dispense with a separate inclosing-box and reduce the weight of the camera.

The invention consists of a photographic camera in which the lid serves as the front of the camera, while the body of the box serves, by means of guide-rails in connection with a friction device, as a bed or way, on which the adjustable sliding part of the camera is supported. The lid or cover of the box is provided with an opening for the lens and a removable cap, and is connected at the inside to the bellows-shaped portion of the camera. In connection with the ground focusing-glass is used a collapsible dark box with eye-apertures for adjusting the image on the focusing-glass. The dark chamber is provided with means for retaining the same in an extended or folded position on the end frame of the camera.

Figure 1:
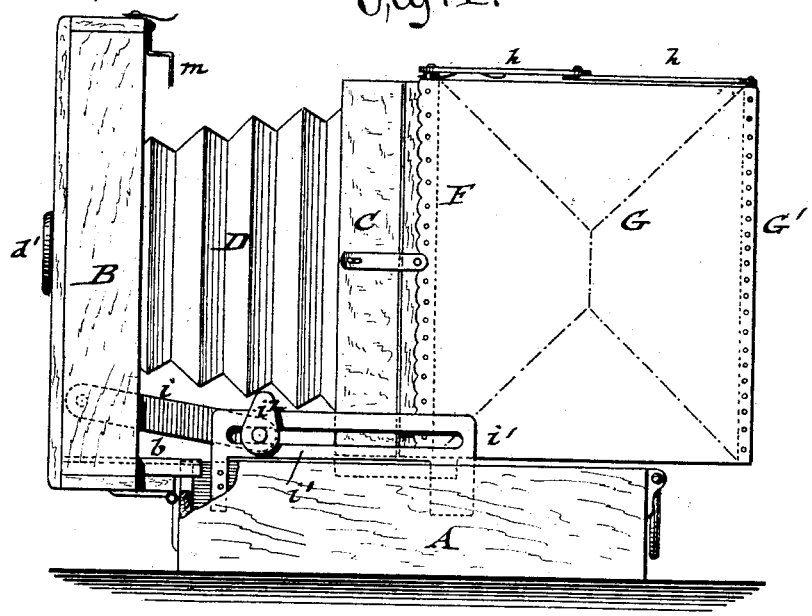
Figure 2:
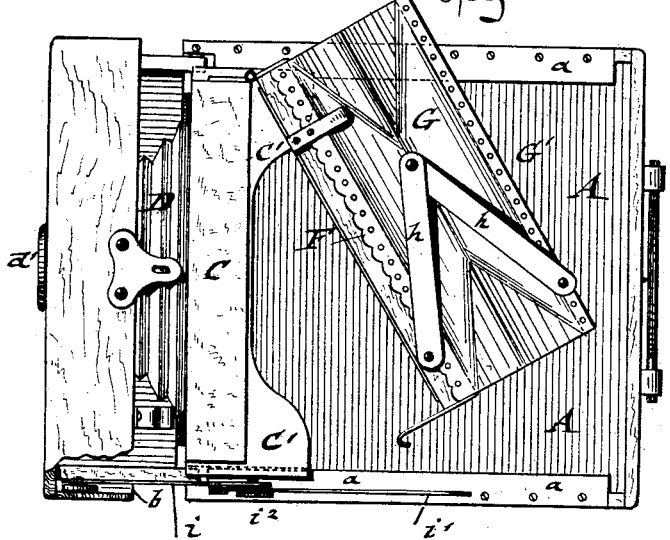
Figure 3:
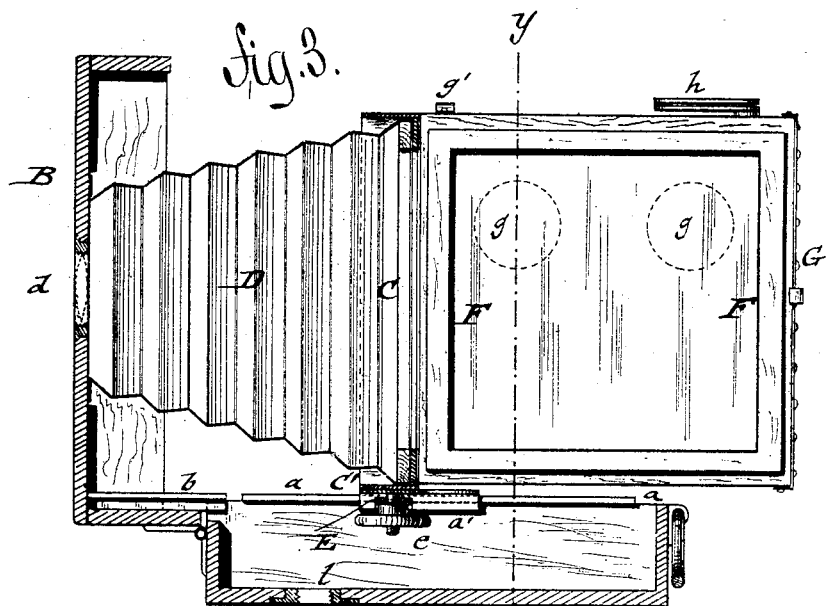
Figure 4:
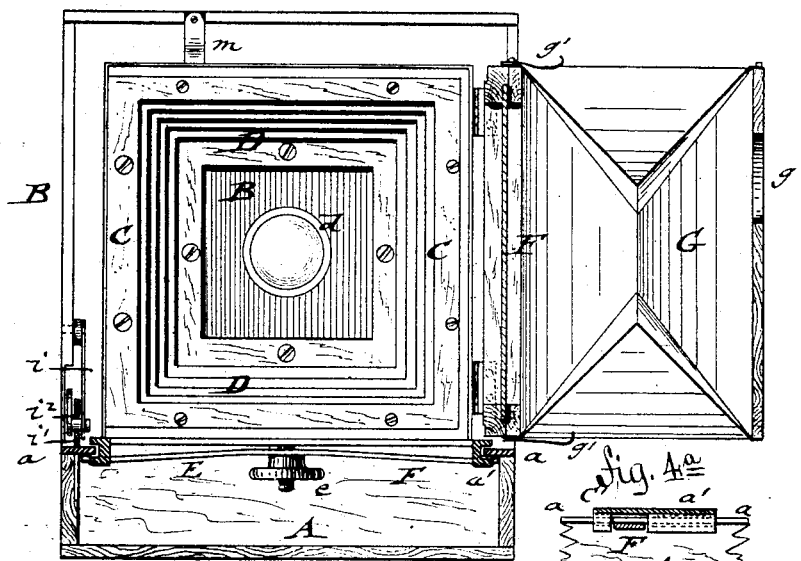
Figure 5:
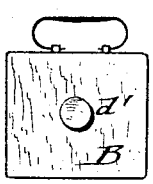

In the accompanying drawings, Figure 1 represents a side elevation of my improved portable photographic camera, shown in position for use. Fig. 2 is a plan of the same, with a part broken away and arranged to show the hinged dark chamber partly swung away from the camera. Fig. 3 is a vertical longitudinal section of the camera, showing the dark chamber swung sidewise. Fig. 4 is a vertical transverse section of the same on line $y\,y$, Fig. 3. Fig. 4ª is a detail view of one of the sliding supports and the friction-brake; and Fig. 5 is an end view of the camera, shown in position to be carried.

Similar letters of reference indicate corresponding parts.

A in the drawings represents the body, and B the lid or covering, of the box which incloses my improved photographic camera. The lid or cover B is hinged by its downwardly-extended rear wall to the body A, at such a distance below the upper edge of the same as to bring short guide-rails, $b\,b$, which are attached to the rear wall of the lid or cover B, in line with the side guide-rails, $a\,a$, of the body A when the lid is thrown up into vertical position, as shown in Figs. 1 and 3.

The bellows-shaped extensible portion D of the camera is attached at its front end to the lid B, while its end frame, C, is secured to a transverse base-piece, C', that slides by its grooved ends $a'\,a'$ along the guide-rails $b\,b$ of the lid onto the guide-rails $a\,a$ of the body, and back from the guide-rails of the body to the guide-rails of the lid, according as the camera is drawn out for use or folded up for being stored away in the box A B. The guide-rails $a\,a$ of the body A form a bed or way for the base-plate C' of the camera, so as to be properly adjusted relatively to the lens, which is screwed into an opening, $d$, of the cover B, said opening being closed when the apparatus is folded up by a screw-cap, $d'$, while the lens is stored away in the body of the box.

To obtain a steady movement of the end frame, C, and retain it in position after adjustment, a friction device, E, is employed, which consists preferably of a transverse bar or spring of metal, wood, or other suitable material, that is secured centrally to the end frame, C, by means of a clamp-screw, $e$, and extended through recesses of the side guides, $a'$, to the under side of the rails $a\,a$ and $b\,b$, so as to press thereon and retain by their friction with the rails the camera in the position to which it has been set. The clamping-screw $e$ serves to increase or decrease the friction exerted by the bar E upon the rails, and to hold thereby the camera rigidly in position for use. The end frame, C, is adapted to receive the plate-holder with the sensitized glass plate.

The focusing-frame F, which carries the ground glass, is hinged or otherwise connected to the end frame, C.

Back of the focusing-frame F, and permanently or detachably connected thereto, is arranged a collapsible dark chamber, G, the rear wall, G', of which is provided with apertures $g$ for the eyes. This dark chamber may be folded by its bellows-shaped middle portion against the focusing-frame F and retained thereon by suitable top and bottom spring hooks or catches, $g'$, or it may be extended to its full length and locked in this position by pivoted lockingarms h h, as shown clearly in Figs. 1 and 2, which figures show the dark chamber, respectively, open and partly folded. The dark chamber G serves for the purpose of dispensing with the dark cloth, with which the operator usually covers his head and the focusing-plate, so as to shut out the light, with the exception of the rays that enter through the lens and throw a reversed image of the object on the ground glass.

A folding guard may be used in connection with the rear plate, G', of the dark chamber G, so as to prevent the light from passing through the apertures into the dark chamber G. The dark chamber G may be attached directly to the focusing-frame, or to a separate frame which is locked to the focusing-frame, as desired, the latter mode of attachment allowing it to be detached for cleaning the ground focusing-glass.

In adjusting the image of the object higher or lower on the focusing glass it is necessary to swing the cover B on its hinges forward or back into different angles to the body A.

To secure the focusing-glass into proper position after adjustment the cover B is connected by a pivot-strap, i, with a slotted guide-rail, i', at one side of the body A. The pivot-strap i is clamped at any desired point on the rail i' by a thumb-nut, i², as shown clearly in Figs. 1 and 2.

The bottom of the body A is arranged with a screw-socket, l, by which the box may be attached to a tripod or other suitable means of support.

When the dark chamber G is folded onto the focusing-frame and retained thereon by the spring-catches g', and then pushed back, together with the camera C D, into the lid B, it is retained on the rails b b at the lower part of the lid B by the friction device E, and at the upper part by a pivoted retaining-hook, m. The cover B is then lowered, together with the folded camera and dark chamber, down into the body A and locked thereto.

The body A may be of any desired depth to allow the negative-holders, lens, and other articles to be stored therein.

A handle is applied to the body A, and serves to carry the same conveniently from place to place.

Having thus described my invention, I claim as new and desire to secure by Letters Patent—

1. The combination, in a portable photographic camera, of the body and hinged lid of an inclosing-box with a camera, of which the hinged lid forms the front wall, while the body forms the support or way upon which the camera is drawn out for adjustment, substantially as specified.

2. In a portable photographic camera, the combination, with the body and lid of an inclosing-box, provided, respectively, with guide-rails, of a camera having the front end of its bellows-shaped portion applied to the lid, while its end frame is adjustable along guide-rails of the lid and body, and retained thereon by a suitable friction device, substantially as and for the purpose set forth.

3. In a photographic camera, the combination, with a camera and its focusing-frame, of a collapsible dark chamber having a rear wall with eye-openings and means for being retained in folded or extended state, substantially as set forth.

4. The combination, with the supporting-body and hinged lid of an inclosing-box, of a camera attached to the lid and sliding by its end frame on ways of the body, a focusing-frame applied to the end frame, a collapsible dark chamber applied to the focusing-frame, and of means for locking the same to the focusing-frame in folded or extended state, substantially as set forth.

5. The combination, with an inclosing-box, composed of a body and hinged lid, of a camera, of which the hinged lid forms the front wall, while the body forms the support or way upon which the camera is drawn out for adjustment, and of means whereby the hinged lid may be locked at any suitable angle of inclination to the body, substantially as specified.

6. The combination, with the body and hinged lid of an inclosing-frame, both having guide-rails, one at its side, the other at its rear wall, of a camera, of which the hinged lid forms the front wall, while its end frame is adjustable along the guide-rails of the body and lid, and of pivoted connecting-straps, and of means by which the latter are adjustably secured to the body of the box, whereby the lid is supported at a suitable angle of inclination to the body of the box, substantially as set forth.

In testimony that I claim the foregoing as my invention I have signed my name in presence of two subscribing witnesses.

WILLIAM THOMAS.

Witnesses:
PAUL GOEPEL,
SIDNEY MANN.